(12) United States Patent
Dozzini et al.

(10) Patent No.: US 11,002,283 B2
(45) Date of Patent: May 11, 2021

(54) MAGNETIC BEARING FOR A TURBOMACHINE

(71) Applicant: Nuovo Pignone Tecnologie Srl, Florence (IT)

(72) Inventors: Matteo Dozzini, Torgiano (IT); Manuele Bigi, Calenzano (IT); Duccio Fioravanti, Touscany (IT); Massimiliano Ortiz Neri, Pisa (IT)

(73) Assignee: NUOVO PIGNONE TECNOLOGIE SRL, Florence (IT)

(*) Notice: Subject to any disclaimer, the term of this patent is extended or adjusted under 35 U.S.C. 154(b) by 0 days.

(21) Appl. No.: 16/077,390

(22) PCT Filed: Mar. 17, 2017

(86) PCT No.: PCT/EP2017/056339
§ 371 (c)(1),
(2) Date: Aug. 10, 2018

(87) PCT Pub. No.: WO2017/158138
PCT Pub. Date: Sep. 21, 2017

(65) Prior Publication Data
US 2019/0048884 A1 Feb. 14, 2019

(30) Foreign Application Priority Data
Mar. 18, 2016 (IT) .................. 102016000028696

(51) Int. Cl.
*H02K 7/09* (2006.01)
*H02K 1/32* (2006.01)
(Continued)

(52) U.S. Cl.
CPC ......... *F04D 29/048* (2013.01); *F04D 29/058* (2013.01); *F04D 29/0563* (2013.01);
(Continued)

(58) Field of Classification Search
CPC .. F04D 29/048; F04D 29/584; F04D 29/0563; F04D 29/058; F04D 7/02;
(Continued)

(56) References Cited

U.S. PATENT DOCUMENTS 3,947,153 A * 3/1976 Matthias ............... F04D 29/047
417/365
5,438,755 A * 8/1995 Giberson .............. B23P 15/006
29/558
(Continued)

FOREIGN PATENT DOCUMENTS

DE 2 336 488 A1 2/1975
EP 0 317 946 A2 5/1989
(Continued)

OTHER PUBLICATIONS

Search Report and opinion issued in connection with corresponding IT Application No. 102016000028696 dated Oct. 10, 2016.
(Continued)

*Primary Examiner* — John K Kim
(74) *Attorney, Agent, or Firm* — Baker Hughes Patent Org.

(57) ABSTRACT

A magnetic bearing for a turbomachine includes a stator fixable to a structure of a turbomachine; a rotor magnetically coupled to the stator and defining a rotation axis, the rotor having a front central surface, a rear central surface opposite to the front central surface and an external surface with respect to the rotation axis; the rotor is provided with an internal channel configured to displace cooling fluid.

11 Claims, 3 Drawing Sheets

(51) Int. Cl.
*F04D 29/048* (2006.01)
*F16C 37/00* (2006.01)
*F16C 32/04* (2006.01)
*F04D 29/058* (2006.01)
*F04D 29/056* (2006.01)
*F04D 29/58* (2006.01)
*F04D 1/00* (2006.01)
*F04D 7/02* (2006.01)

(52) U.S. Cl.
CPC ........ *F04D 29/584* (2013.01); *F16C 32/0442* (2013.01); *F16C 37/005* (2013.01); *H02K 1/32* (2013.01); *H02K 7/09* (2013.01); *F04D 1/00* (2013.01); *F04D 7/02* (2013.01); *F16C 2360/24* (2013.01)

(58) Field of Classification Search
CPC .... F04D 1/00; H02K 7/09; H02K 1/32; F16C 32/0442; F16C 37/005; F16C 2360/24
USPC ....................................................... 310/90.5
See application file for complete search history.

(56) References Cited

U.S. PATENT DOCUMENTS

| | | | | |
|---|---|---|---|---|
| 6,057,619 | A * | 5/2000 | Domberg | F16C 32/0468 310/90.5 |
| 7,274,123 | B2 * | 9/2007 | Shimada | F16C 32/0476 310/90.5 |
| 7,285,887 | B2 * | 10/2007 | Shimada | F16C 32/0476 310/90.5 |
| 10,393,174 | B2 * | 8/2019 | Baudelocque | F16C 32/0476 |
| 2016/0102705 | A1 * | 4/2016 | Mei | F16C 32/0442 310/90.5 |
| 2016/0108967 | A1 * | 4/2016 | Massini | F16C 32/0459 310/90.5 |
| 2019/0048884 | A1 * | 2/2019 | Dozzini | F04D 29/048 |

FOREIGN PATENT DOCUMENTS

| | | |
|---|---|---|
| EP | 2784326 A1 | 10/2014 |
| EP | 2 808 572 A1 | 12/2014 |
| EP | 2808552 B1 | 3/2019 |
| FR | 3 022 963 A1 | 1/2016 |
| JP | H0571533 A | 3/1993 |

OTHER PUBLICATIONS

International Search Report and Written Opinion issued in connection with corresponding PCT Application No. PCT/EP2017/056339 dated Jun. 2, 2017.

International Preliminary Report on Patentability issued in connection with corresponding PCT Application No. PCT/EP2017/056339 dated Sep. 18, 2018.

* cited by examiner

MAGNETIC BEARING FOR A TURBOMACHINE

BACKGROUND OF THE INVENTION

The present disclosure relates to a magnetic bearing for a turbomachine. In the following disclosure a specific application of such bearing will be discussed in detail, namely a shaft of a motorcompressor. However, no loss of generality will be intended, since the same principles apply equally in similar applications.

Generally a motorcompressor unit comprises a centrifugal compressor processing a process gas. The compressor is arranged in a housing together with a motor, usually consisting of an electric motor. The compressor generates a flow of compressed process gas.

With more detail, the motor drives the compressor via a shared rotating shaft supported on each end by magnetic bearings. The shaft connects the rotor of the electric motor and the rotor of the centrifugal compressor on which the impellers of the compressor are installed. The shaft usually does not project outside the casing(s). Motorcompressor units used in the production or transport of hydrocarbons are provided with a shared rotating shaft supported by a rotor-bearing system.

When used to directly drive a compressor, such as a centrifugal compressor, the shaft is required to rotate at relatively high speeds. Also, in case of electric motor, heat is generated by the electrical systems that are characteristic of electric motor drivers. In addition to the heat generated by electrical loss mechanisms, operating the motorcompressor device at high speeds increases frictional losses generated by the rotating components. This effect is further increased since the rotating components operate in pressurized gas.

If this heat is not properly dissipated, it negatively affects the performance of the motor and can damage the insulation of the stator. Increased temperatures can also adversely affect the rotor-bearing systems of both the compressor and motor, thus leading to bearing damage and/or failure.

For cooling the motor and bearings in a motorcompressor unit, a cooling circuit is provided which may be an open loop cooling circuit or a quasi-closed-loop cooling circuit. In an open loop, an external cooling gas is used, while in a quasi-closed-loop circuit the cooling gas is process gas drawn from the process stream at some point in the compression process. This cooling gas is then passed through the motor and bearing areas to absorb heat.

According to the current art, the cooling media may be cooled through an external cooler. In this case, the cooling gas may be pressurized through a fan or impeller, attached to the shaft, before entering the motor area. The impeller also forces the cooling media to flow into cooling ducts in order to cool the other parts that have to be cooled such as bearings and electrical items. The process gas is then circulated through an external cooler where is itself cooled.

In case of an open circuit usually there is no need to employ either the fan or the cooler.

An axial magnetic bearing part of the state of the art comprises a statoric element, which is attached to the supporting structure of the motorcompressor, and a rotoric element, which is mechanically connected to the shaft. The rotoric element and the statoric element are magnetically coupled so that, in use, the axial thrust generated in the machine due to several effects like differential pressure across surfaces, variation of momentum of the gas, weight, etc., is opposed by a magnetic force developing on the rotoric element of the bearing, without any contact with the stator. The motorcompressor also comprises mechanical backup bearings, which act if the magnetic bearings should fail or if the forces acting on the shaft are greater than the capacity of magnetic bearing to counteract them. On the shaft, the magnetic bearing may be placed near the motor. The mechanical bearing is placed next to the magnetic bearing. On some configurations, the impeller is placed on the end of the shaft, thus being placed in a overhang position with respect to the motor.

SUMMARY OF INVENTION

A first embodiment of the invention therefore relates to a magnetic bearing for a turbomachine. The magnetic bearing comprises a stator fixable to a structure of a turbomachine. A rotor is magnetically coupled to the stator, and defines a rotation axis. The rotor is provided with an internal duct configured to displace cooling fluid.

In an embodiment, in this way the rotor of the magnetic bearing can also act as an impeller for the cooling fluid. Therefore such impeller can be omitted from the turbomachine, thus reducing weight and size of the components that have to be attached to the shaft. Consequently, it is possible to reduce the total overhang on the shaft. Also, the machine can be shorter and, since it has fewer components, can be assembled in less time.

BRIEF DESCRIPTION OF THE DRAWINGS

Further details and specific embodiments will refer to the attached drawings, in which.

DETAILED DESCRIPTION

Figure 1:
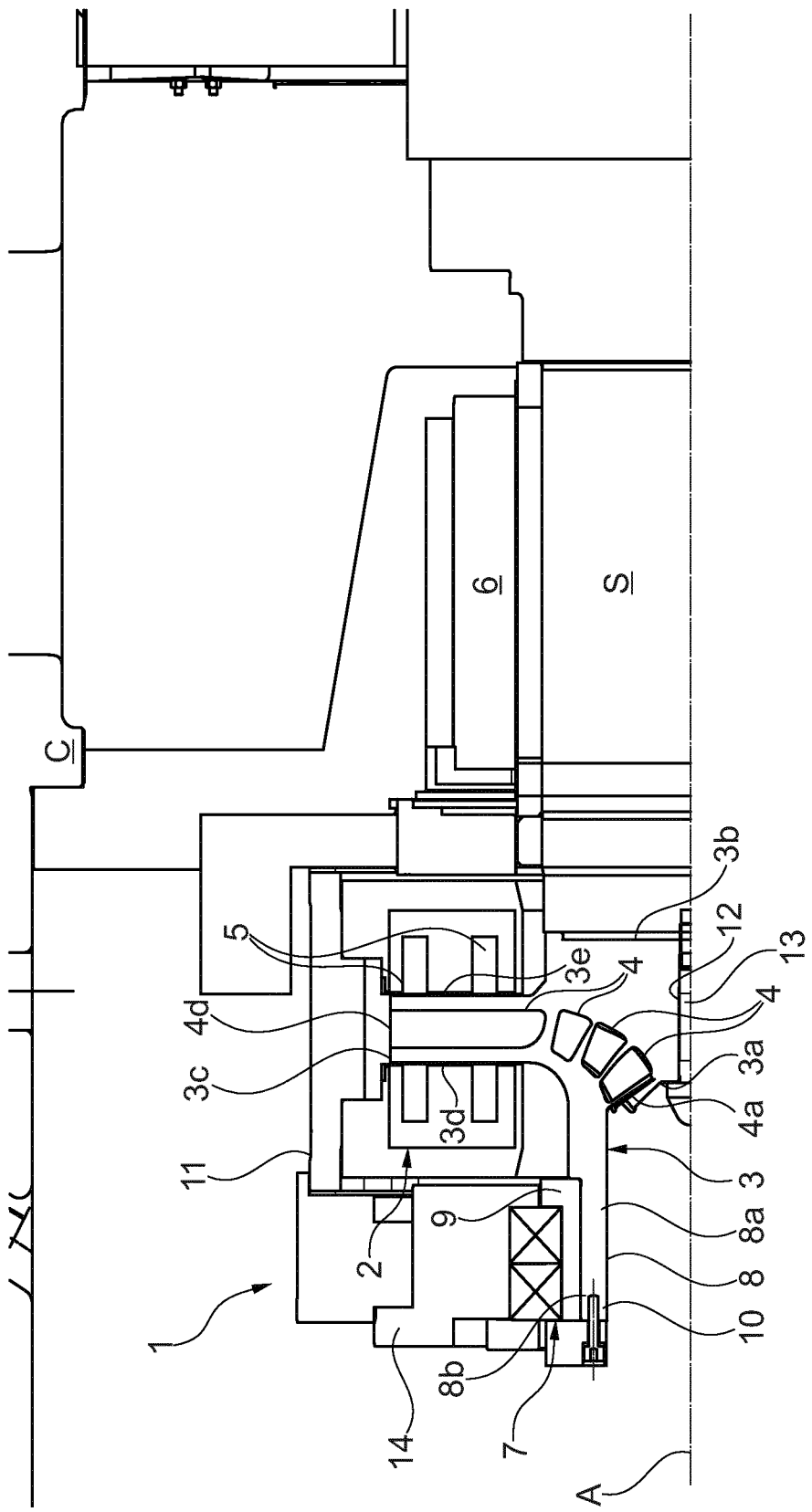
FIG. 1 is a side sectional view of a magnetic bearing according to a an embodiment.

The following description of exemplary embodiments refer to the accompanying drawings. The same reference numbers in different drawings identify the same or similar elements. The following detailed description does not limit embodiments of the invention. Instead, the scope of embodiments of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

With reference to the attached drawings, with the number 1 is indicated a magnetic bearing for a turbomachine.

Such magnetic bearing 1 is typically installed between the structure "C" of the turbomachine and the shaft "5". Indeed, the magnetic bearing 1 is installed between the structure "C" of the turbomachine and the shaft "5". The purpose of the magnetic bearing 1 is to support the shaft "S" itself with all of the rotoric stages of the turbomachine (which are not shown in the drawings).

The magnetic bearing 1 comprises a stator 2, which is fixable to the above mentioned structure "C". With more detail, the stator is, in an embodiment, an electromagnet comprising a plurality of coils 5. The electromagnet 2 and the coils 5, being of a known type, won't be described with additional detail in the present disclosure.

The magnetic bearing 1 also comprises a rotor 3, which is magnetically coupled to the stator 2. The rotor 3 defines a rotation axis "A". With more detail, the rotor 3 has a front central surface 3a, placed transversally with respect to the rotation axis "A". A rear central surface 3b is opposite to the front central surface 3a, also placed transversally with respect to rotation axis "A". Also, an external surface 3c is defined as a substantially circumferential surface, placed externally with respect to the rotation axis "A". Also, the rotor 3 has a front peripheral surface 3d, which is placed externally with respect to the front central surface 3a. The front peripheral surface 3d also borders the external surface 3c. Similarly, the rotor 3 has a rear peripheral surface 3e, which is placed externally with respect to the rear central surface 3b. The rear peripheral surface 3e also borders the external surface 3c.

Figure 2:
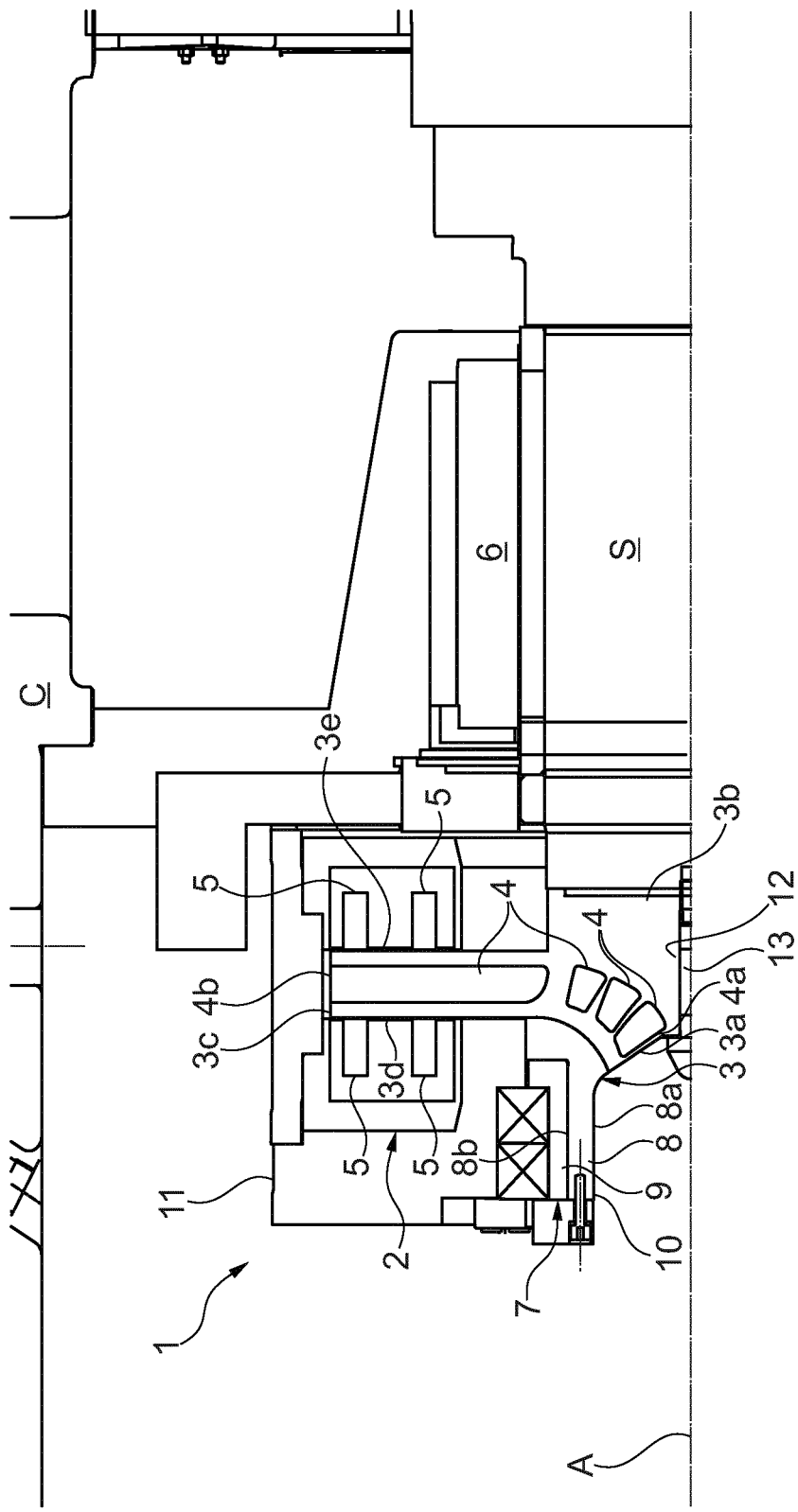
FIG. 2 is a side sectional view of a magnetic bearing according to an embodiment.
Figure 3:
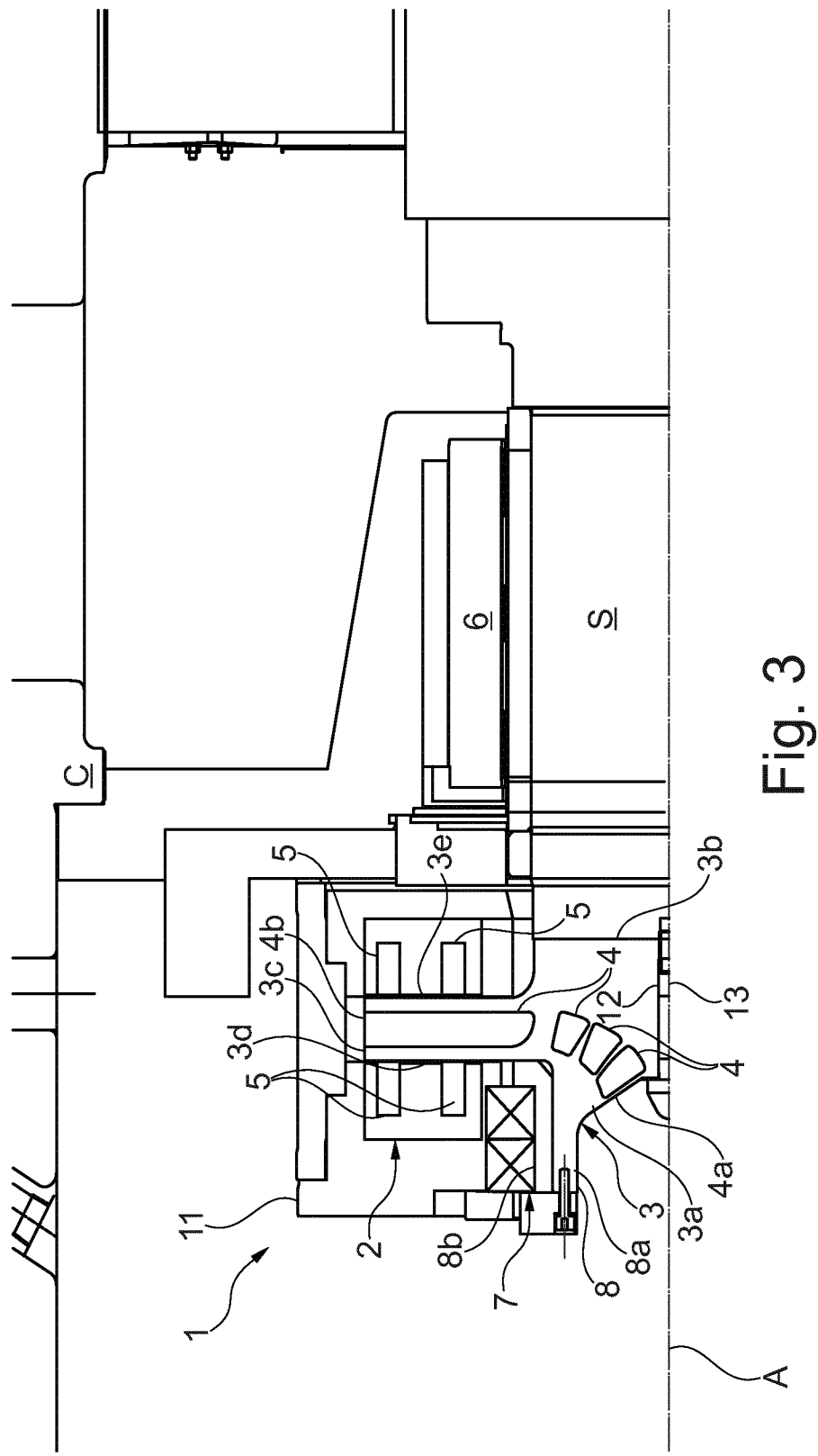
FIG. 3 is a side sectional view of a magnetic bearing according to an embodiment.

The above described coils 5, part of the stator 2, are arranged around the rotor 3. In particular, the coils 5 are arranged by pair. In each pair, a coil 5 faces the front peripheral surface 3d of the rotor 3, while another coil 5 faces the rear peripheral surface 3e. The pairs of coils 5 are arranged along radial directions extending from the rotation axis "A". One or more pair can be placed on a single radial direction. As shown in FIGS. 1-3, in the presently described embodiments a single pair of coils 5 are provided. These coils 5 are continuous along substantially the entire circumference of the stator 2. In other embodiments, not shown in the drawings, any number of pairs of coils 5 can be arranged radially. In other words, the coils 5 have a uniform distribution along the periphery of the rotor 3. Therefore, the rotor 3 and the stator 2 perform the function of an axial magnetic bearing in the bearing 1.

As shown by the FIGS. 1-3, the rotor 3 is provided with an internal channel 4 configured to move cooling fluid. Indeed, the rotor 3 is, in an embodiment, provided with a plurality of internal channel 4, arranged in a radial symmetry around the rotation axis "A". Still, with other words, the rotor 3 is configured internally as a centrifugal impeller, in particular a shrouded impeller, thereby allowing it to perform such function in addition to its mechanical role in the magnetic bearing 1.

With additional detail, each channel 4 has an intake 4a placed on the front central surface 3a of the rotor 3. Also, each duct has an outlet 4b located onto the side surface 3c of the rotor 3. Indeed, the channels 4 are configured so as to direct the cooling fluid on a motor (not shown in the drawing) of said turbomachine. In other embodiments, the rotor 3 may direct the cooling fluid on any part of the turbomachine that needs cooling. It is to be noted that in all the embodiments the rotor 3 provides its own cooling, thereby removing the need to provide a cooling system for the rotor 3.

It is particularly to be noted that the rotor 3 described above is attachable to an end of the shaft "S" of the turbomachine. In other words, the rotor 3 is placed in an overhanging configuration. To fix the rotor 3 at the end of the shaft "S", it is provided with a hole 12 for a screw 13. The hole 12 is coaxial with the rotation axis "A". In other embodiments of the invention, not shown in the drawings, other known fixing means can be used instead of the hole 12 and the screw 13. For example, in other embodiments of the invention, not shown in the drawings, the rotor 3 can be made as a single piece with the shaft "S" of the turbomachine. Also, in other embodiments, not shown in the drawings, the rotor 3 may be placed in a configuration different from the above described overhanging configuration.

With reference to FIGS. 1-3, the magnetic bearing 1 also comprises a radial magnetic bearing 6. Such radial magnetic bearing 6 acts directly between the structure "C" and the shaft "S" of the turbomachine. The radial magnetic bearing 6, being of known type, will not be further described.

Also, the magnetic bearing 1 comprises a mechanical backup bearing 7, which is configured to act on the shaft "S" to support it, in particular when the axial magnetic bearing fails or if the forces acting on the magnetic bearing 1 are greater than its capacity to counteract them. With more detail, such mechanical backup bearing 7 acts on the rotor 3 to support the shaft "S" through the rotor 3.

With additional detail, the mechanical backup bearing may be a ball bearing or bushing bearing.

To engage the mechanical backup bearing 7, the rotor 3 is provided with a support 8, which extends from the front central surface 3a. With more detail, the support 8 as an internal surface 8a, which defines a cylindrical cavity 10. The support 8 also has an external surface 8b which is attached to the mechanical backup bearing 7. Indeed, it is to be noted that the support 8 for the mechanical bearing 7 extends outwardly with respect from both the rest of the rotor 3 and with respect to the shaft "S" of the turbomachine.

With additional detail, a landing sleeve 9 is attached to the rotor 3, in particular to the support 8. The landing sleeve 9 is configured to directly engage the mechanical backup bearing 7.

According to an embodiment of the invention, shown in FIGS. 1 and 2, the landing sleeve 9 is attached to the external surface 8b of the support 8. According to another embodiment of the invention, shown in FIG. 3, the landing sleeve 9 is made as a single piece with the rotor 3. In this case, the surface 8b of the support 8 is partially defined on the landing sleeve 9.

In order to house the stator 2, the magnetic bearing 1 also comprises a cartridge 11, which is in particular attached to the structure "C" of the turbomachine. Furthermore, part of the rotor 3 is also housed inside the cartridge 11. With additional detail, the cartridge 11 is placed externally with respect to the rotor 3, which is nevertheless partially contained inside the cartridge 11. Indeed, the peripheral surfaces 3d, 3e, as well as the external surface 3c of the rotor 3, are enveloped by the stator 2 and, consequently, are mostly inside the cartridge 11.

It is also to be noted that, according to the embodiment of the invention shown in FIGS. 2 and 3, the above mentioned mechanical backup bearing 7 is also housed inside the cartridge 11.

As shown in FIG. 1, in another embodiment the magnetic bearing 1 may also comprise a further cartridge 14, which is distinct from the cartridge 11. In this case, the mechanical backup bearing 7 is housed inside the further cartridge 14.

Also, the further cartridge 14 is attached to the cartridge 11 described above. The further cartridge 14 is placed externally with respect to the rotor 3 and, in particular with respect to the landing sleeve 9.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. Magnetic bearing for a turbomachine, comprising:
   a stator fixable to a structure of a turbomachine and defining a stator circumference;
   a rotor magnetically coupled to the stator and defining a rotation axis, the rotor having a front central surface, a rear central surface opposite to the front central surface, an external surface with respect to the rotation axis, and a plurality of internal channels configured to displace cooling fluid; and
   a mechanical backup bearing configured to act on the rotor to support the rotor,
   wherein the rotor comprises a support spaced away from the shaft and extending outwardly from the front central surface, the mechanical backup bearing configured to engage the support, and each channel of the plurality of channels has an intake placed on the front central surface of the rotor, the front central surface being transversally placed relative to the rotation axis.

2. Magnetic bearing according to claim 1, wherein the plurality of channels are configured to direct the cooling fluid on a motor of the turbomachine.

3. Magnetic bearing according to claim 2, further comprising a landing sleeve attached to the rotor and configured to engage the mechanical backup bearing.

4. Magnetic bearing according to claim 3, further comprising a cartridge, the stator housed inside the cartridge.

5. Magnetic bearing according to claim 4, further comprising an additional cartridge, wherein the mechanical backup bearing is housed inside the additional cartridge.

6. Magnetic bearing according to claim 4, also comprising a further cartridge, distinct from the cartridge, the mechanical backup bearing being housed inside the further cartridge.

7. Magnetic bearing according to claim 1, wherein the rotor is attachable to an end of a shaft of a turbomachine.

8. Magnetic bearing according to claim 7, wherein the rotor is provided with a hole for a screw, the hole being coaxial with the rotation axis.

9. Magnetic bearing according to claim 1, wherein the rotor is a shrouded impeller.

10. Magnetic bearing according to claim 1, wherein the support is cantilevered and extends longitudinally in a direction parallel to the rotation axis.

11. Magnetic bearing according to claim 1, wherein the stator comprises two coils each being continuous along the entire stator circumference; the rotor has a front peripheral surface external with respect to the front central surface, a rear peripheral surface external with respect to the rear central surface; and one coil of the pair of coils faces either the front peripheral surface of the rotor while the other coil of the pair of coils faces the rear peripheral surface of the rotor.

* * * * *